Jan. 17, 1950
W. E. MOORE
2,494,775
ARC ELECTRODE SUPPORT
Filed Jan. 31, 1946
2 Sheets-Sheet 1
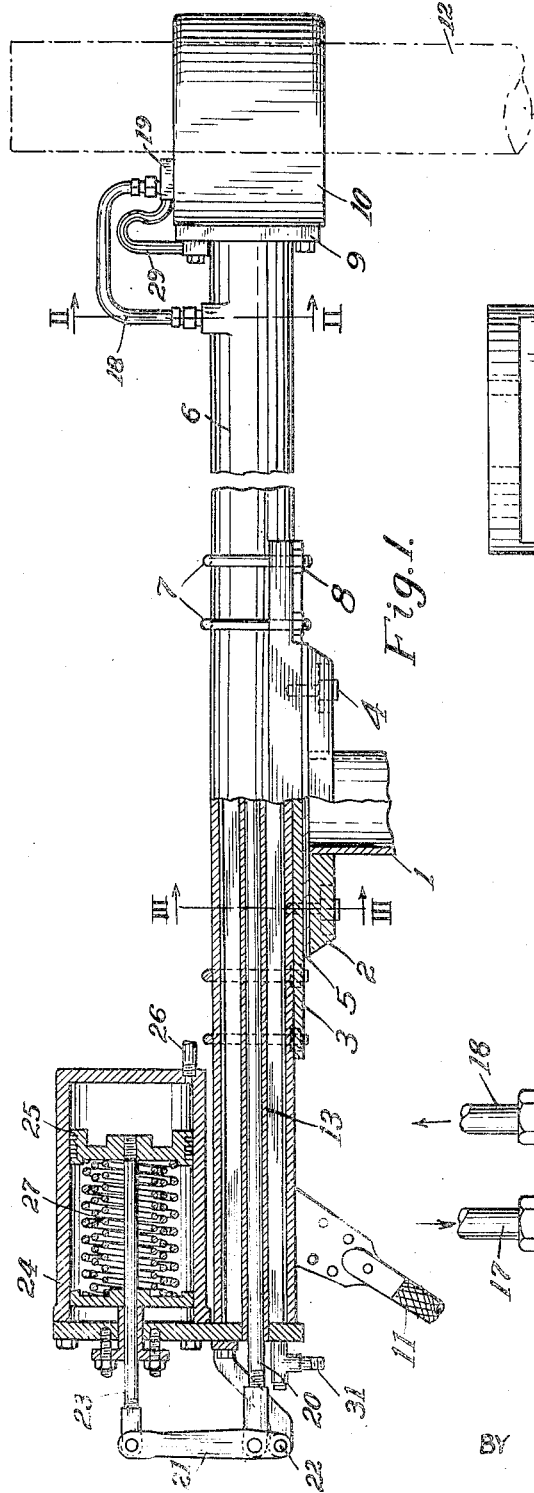
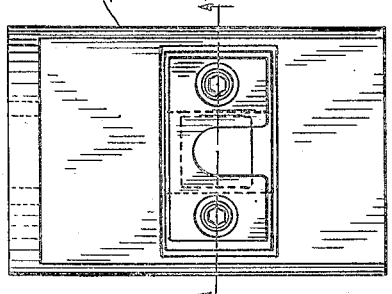
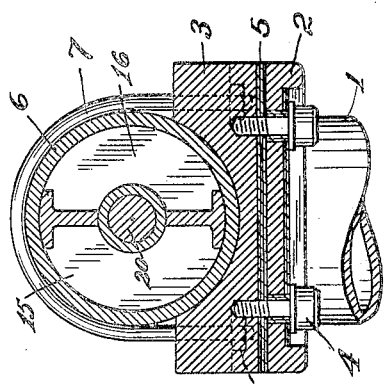
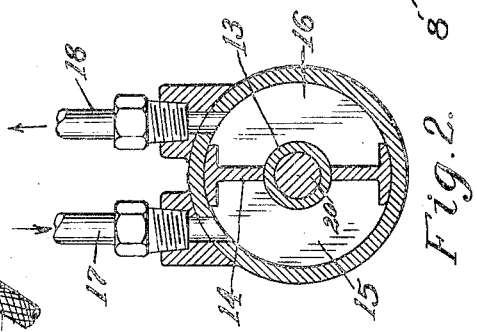
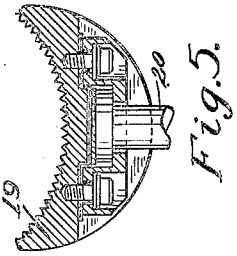
INVENTOR
*William E. Moore*
BY *Christy, Parmelee and Strickland*
ATTORNEY Jan. 17, 1950 W. E. MOORE 2,494,775
ARC ELECTRODE SUPPORT Filed Jan. 31, 1946 2 Sheets-Sheet 2

INVENTOR
*William E. Moore*
BY
*Christy, Parmelee and Strickland*
ATTORNEY

Patented Jan. 17, 1950

2,494,775

UNITED STATES PATENT OFFICE 2,494,775

ARC ELECTRODE SUPPORT

William E. Moore, Pittsburgh, Pa., assignor to Delaware Engineering Corporation, Pittsburgh, Pa., a corporation of Delaware Application January 31, 1946, Serial No. 644,583

8 Claims. (Cl. 13—14)

This invention relates generally to an electric arc furnace and, more particularly, to an electrode supporting structure especially useful in an arc furnace, which structure, however, has other applications as well.

In many electric arc furnaces, as used at present, the supporting structure for the arc electrodes generally gives not altogether satisfactory performance due to various causes, one of which is the tendency of overheating of the electrode supporting structure by the arc and another being the lack of a suitable adjusting means to provide easy adjustability of the arc electrodes.

An object of my invention is to provide a novel electrode supporting structure which is particularly useful in electric arc furnaces and which is devoid of the above named disadvantages common in many similar devices in the prior art.

A more specific object of my invention is to provide a novel arc furnace electrode supporting structure which is efficiently cooled with a fluid to protect the structure from deleterious effects of the arc.

A still further object of my invention is to provide an arc electrode support structure that is easily adjustable by a novel fluid-pressure released, spring-applied shoe or clutch means.

A further specific object of my invention is to provide a novel arc furnace electrode supporting structure that incorporates yieldable adjusting means to afford quick and simple adjustment of the electrodes with respect to their supporting structure.

A still more specific object of my invention is to provide an electrode supporting structure for an arc furnace which structure has a shoe or clutch member for adjustably holding the electrode in a predetermined position and which shoe is spring-applied and releasable by fluid pressure.

Other objects and advantages will be more fully understood by reference to the following specification taken with the accompanying drawings wherein:

Figure 1 is a vertical elevation partly in cross-section of an electrode supporting structure for an electric arc furnace which structure embodies the principles of my invention.

Figure 2 is a cross-sectional view taken along line II—II of Figure 1.

Figure 3 is a cross-sectional view taken along line III—III of Figure 1.

Figure 4 is an elevational view of the shoe and associated structure for holding the electrode shown in Figure 1.

Figure 5 is a cross-sectional view taken along line V—V of Figure 4.

Figure 6:
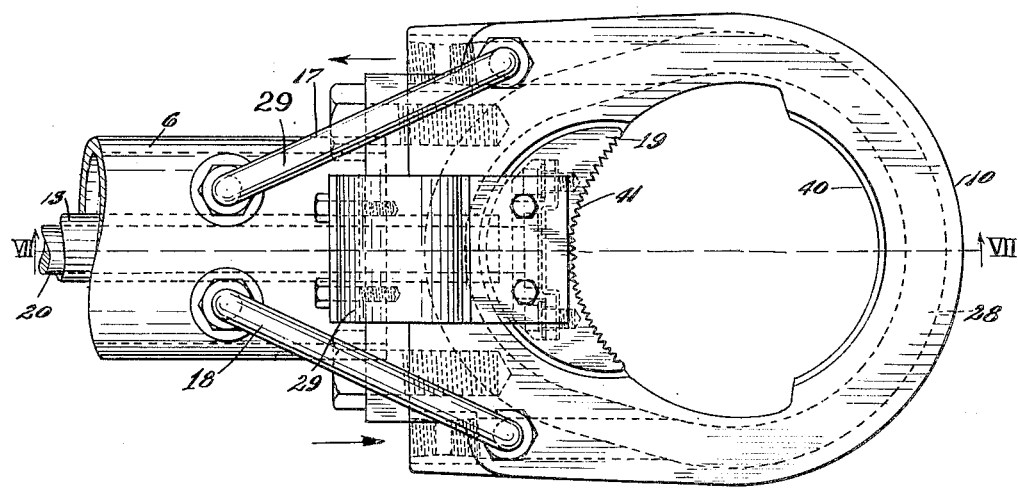
Figure 6 is an enlarged top view of the shoe and associated structure shown in Figures 1 and 4.

The present application relates to the specific details of electrode supporting structure illustrated and described only briefly in my copending application Serial No. 535,332 entitled "Top-charged electric furnace," filed May 12, 1944, now Patent 2,472,954. Such application refers to an electric arc furnace of the top charge type wherein a hydraulic ram is provided for lifting the roof from the furnace crucible which ram incorporates a cam means to simultaneously effect sidewise swing during hydraulic lifting of the roof. As described in said application, a separate hydraulic ram, referred to hereinafter as the electrode ram, may be provided for each electrode to vertically adjust the position of the electrode relative the roof.

Referring more particularly to Figure 1 numeral 1 denotes an extension of the above described electrode ram which has rigidly secured to the top end thereof a bracket head 2. A cradle 3 is rigidly supported on bracket head 2 by means of bolts such as 4. Cradle 3 is insulated from head 2 by means of suitable washer and tube insulation 5. An electrode supporting arm or tube 6 rests upon and is rigidly fastened to cradle 3 by substantially U-shaped bolts 7 secured by nuts 8.

Tube 6 is made of copper or other electrically conductive material and is capped with a flange 9 bolted to electrode clamp 10 and therefore is in electrical contact therewith so that the electric current from cable 11 will be conducted through tube 6 to flange 9, to clamp 10 to electrode 12, and also from cable 11, through tube 6, to flange 9, through flexible terminal 29 to shoe 19, to electrode 12. The electrode 12 is shown in dash and dot lines.

Tube 6 has concentrically disposed therein a small central guide tube 13 which is spaced from the inner walls thereof by diaphragm 14. The interior of tube 6 is divided by the diaphragm 14 into two passages or conduits 15 and 16 for conducting water or other cooling fluid and which are supplied from a suitable inlet connection 31.

The electrode clamp 10 carries a segmental gripping shoe or clutch 19 within its bore for gripping the electrode 12. This segmental shoe is normally pushed against the electrode 12 by means of a push rod 20 carried through and guided by central tube 13 and is actuated by means of lever 21 having a stationary pivot or fulcrum 22 which lever connects piston rod 23 of cylinder 24 to the push rod. Cylinder 24 has a fluid tight piston 25 movably mounted within the cylinder and attached to the end of piston rod 23, the piston being actuated by fluid pressure supplied through pipe 26. The piston and cylinder arrangement is commonly referred to as a servo-motor.

Piston 25 is normally urged toward the right of the cylinder 24 as illustrated by means of a helical spring cluster 27 so that the effect of the spring tension is to urge shoe 19 into tight gripping relationship with the electrode 12. However, when fluid pressure is applied through pipe 26 the spring pressure is overcome and the shoe 19 is released therefore allowing dropping of the electrode, therefore permitting adjustment of the electrode.

Figure 7:
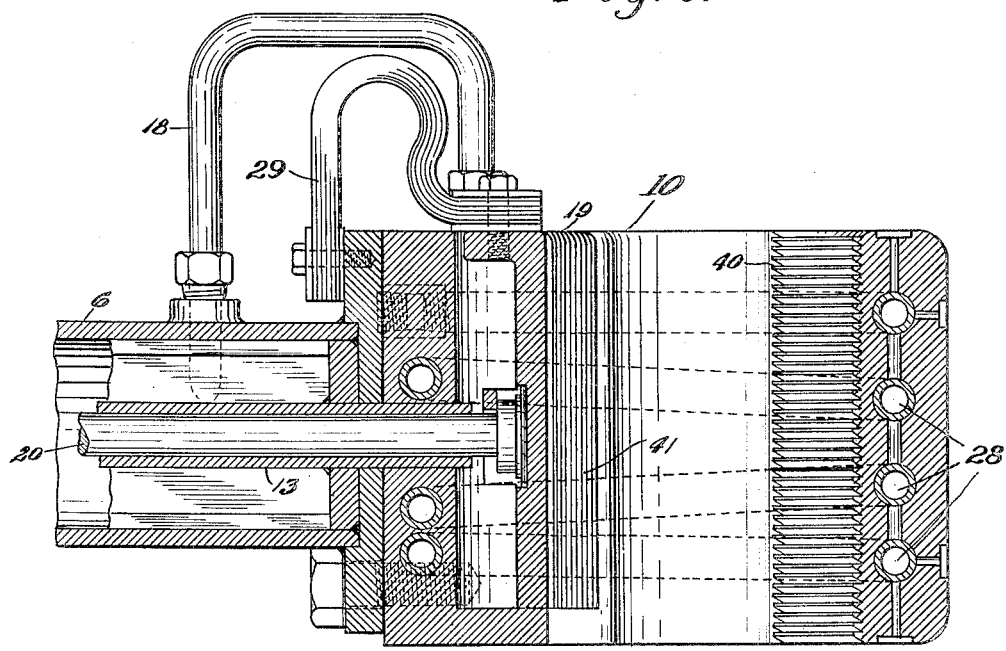
Figure 7 is a cross-sectional view taken along line VII—VII of Figure 6.

As will be more apparent from Figures 6 and 7, the electrode clamp 10 is effectively cooled by means of suitable water cores 28 formed therein which are supplied from the water carried through the electrode arm on one side of the diaphragm 14, thence through pipe 18 and around said water cores of the clamp and through pipe 17 to the opposite side of the diaphragm in tube 6.

The contact surface of the clamp is preferably provided with horizontal ratchet shaped grooves or serrations 40, as shown in Figure 7, for the purpose of better cleaning of the surface of the electrode as it drops, so as to reduce contact resistance, also to afford a better grip on the electrode to aid in overcoming gravity. The shoe 19, however, preferably has vertical grooves 41, as shown in Figure 6, to make it better capable of resisting the torque or turning movement in the electrode when the electrode joints are being screwed together, in which case the clamp is used as the vise.

Piston 25 is preferably operated by air although it may be operated by other fluids or by liquids.

Thus it will be seen that I have provided a compact and efficient electrode clamp having a minimum of connections such as water inlet connection 31, air connection 26 and an electric current supply cable 11 and which satisfactorily protects the electrode support structure from the deleterious heating effects of the arc and which is readily adjustable by fluid pressure means.

While I have illustrated and described a single embodiment of my invention, it will be understood that this is by way of illustration only, and that various changes and modifications may be made within the contemplation of my invention and within the scope of the following claims:

I claim:

1. An electrode support for electric furnaces comprising a tubular arm formed of electrical conducting material supported intermediate its ends on an adjustable support and electrically insulated therefrom, an electrode clamp supported at one end of the arm, a movable clamping shoe in the clamp, an operating rod connected with the shoe extending axially through the arm, a spring-biased servo-motor supported at the other end of the arm remote from the electrode clamp and connected to said rod for operating the shoe and biased to normally hold the shoe in clamping position, a guide tube in said arm in which the rod is slidably received, a diaphragm extending longitudinally of the arm and connected to the arm and to the tube whereby said arm is divided longitudinally to provide parallel water-circulating passages within the arm, said clamp having a water-circulating passage therein, one terminal of said passage being connected with one passage in the arm and having its other terminal within the other passage, means at the end of the arm remote from the clamp providing connections to the said passages, and an electrical connection for connecting said arm to a source of electric current whereby said arm provides an electrical conduit for conducting current to an electrode held in said clamp.

2. An electrode support for electric furnaces comprising a tubular arm supported intermediate its ends on an adjustable support and electrically insulated therefrom, an electrode clamp at one end of the arm, a movable clamping shoe in the clamp, an operating rod connected with the shoe extending axially through the arm, a spring-biased servo-motor at the other end of the arm remote from the electrode clamp for operating the shoe and biased to normally hold the shoe in clamping position, said arm being divided longitudinally into two passages by a diaphragm-forming element connected to the arm, said element having a tubular passageway therethrough in which said operating rod is slidably received, said clamp having a water-circulating passage therein, one terminal of said passage being connected to one passage in the arm, and the other passage being connected with the other passage in the arm, and means at the end of the arm remote from the clamp providing connections for the said passages.

3. An electrode support for electric furnaces comprising a tubular arm formed of electrical conducting material supported intermediate its ends on an adjustable support and electrically insulated from said support, an electrode clamp supported at one end of the arm, and means for clamping an electrode in the clamp comprising a movable clamping shoe in the clamp, an operating rod extending axially through the arm and projecting from the other end thereof, a guide tube in said arm in which the rod is slidably received, a diaphragm extending longitudinally of the arm and connected to the arm and to the tube a cylinder mounted on said last-named end of the arm, a piston in said cylinder, a lever for transmitting motion from the piston to the rod, and a spring biasing said piston to move it in one direction to hold the shoe in clamping position, and means for supplying fluid pressure to the cylinder for operating the shoe to move it out of clamping position, and an electrical connection for connecting said arm to a source of electric current whereby said arm provides an electrical conduit for conducting current to an electrode held in said clamp, said arm further providing a support for said clamping means.

4. An electrode support for electric furnaces comprising a tubular arm supported intermediate its ends on an adjustable support and electrically insulated therefrom, an electrode clamp at one end of the arm, a movable clamping shoe in the clamp, an operating rod connected with the shoe extending axially through the arm, a guide tube in said arm in which the rod is slidably received, a diaphragm extending longitudinally of the arm and connected to the arm and to the tube and a spring-biased servo-motor at the other end of the arm remote from the electrode clamp for operating the shoe and biased to normally hold the shoe in clamping position, said shoe having an electrode-engaging surface which is grooved in a vertical direction whereby to resist turning of the electrode engaged thereby when another section of electrode is being screwed onto it, the clamp having a surface opposite the shoe which is serrated with horizontally-extending teeth to more effectively hold the electrode against downward movement and to clean an electrode by a scraping action as it is moved relative to the clamp.

5. An electrode support for electric furnaces, including a pair of tubes arranged one inside the other, the outer tube constituting an electrode supporting arm, the inner tube constituting a guide tube, a push rod slidable in the guide tube, one of said tubes being formed of electrically conducting material for carrying current to the electrode, and a diaphragm extending longitudinally of the tubes and connected to the two tubes so as to divide the outer tube into two water-circulating compartments, an electrode clamp at one end of the arm, a movable electrode clamping shoe in the clamp, said push rod extending through the guide tube and being connected at one end with the movable shoe.

6. An electrode support for electric furnaces, including a pair of tubes arranged one inside the other, the outer tube constituting an electrode supporting arm, the inner tube constituting a guide tube, a push rod slidable in the guide tube, one of said tubes being formed of electrically conducting material for carrying current to the electrode, a diaphragm extending longitudinally of the tubes and connected to the two tubes so as to divide the outer tube into two water-circulating compartments, an electrode clamp a one end of the arm, a movable electrode clamping shoe in the clamp, said push rod extending through the guide tube and being connected at one end with the movable shoe, and a spring biased servo-motor on the other end of the tube distant from the clamp for actuating the push rod and clamping shoe.

7. An electrode support for electric furnaces, including a pair of tubes arranged one inside the other, the outer tube constituting an electrode supporting arm, the inner tube constituting a guide tube, a push rod slidable in the guide tube, one of said tubes being formed of electrically conducting material for carrying current to the electrode, a diaphragm extending longitudinally of the tubes and connected to the two tubes so as to divide the outer tube into two water-circulating compartments, an electrode clamp at one end of the arm, a movable electrode clamping shoe in the clamp, said push rod extending through the guide tube and being connected at one end with the movable shoe, a spring biased servo-motor on the other end of the tube distant from the clamp for actuating the push rod and clamping shoe, and means in the servo-motor for biasing the shoe toward the electrode.

8. An electrode support for electric furnaces, including a pair of tubes arranged one inside the other, the outer tube constituting an electrode supporting arm, the inner tube constituting a guide tube, a push rod slidable in the guide tube, one of said tubes being formed of electrically conducting material for carrying current to the electrode, and a diaphragm extending longitudinally of the tubes and connected to the two tubes so as to divide the outer tube into two water-circulating compartments, an electrode clamp at one end of the arm, a movable electrode clamping shoe in the clamp, said push rod extending through the guide tube and being connected at one end with the movable shoe, said electrode clamp having a water-circulating passage therein, one terminal of said passage being connected with one compartment in the outer tube and having its other terminal connected to the other compartment.

WILLIAM E. MOORE.

REFERENCES CITED

The following references are of record in the file of this patent:

UNITED STATES PATENTS

| Number | Name | Date |
| --- | --- | --- |
| 1,809,656 | Walter | June 9, 1931 |
| 2,071,937 | Payne | Feb. 23, 1937 |
| 2,086,148 | Young | July 6, 1937 |
| 2,114,231 | Moore | Apr. 12, 1938 |
| 2,133,305 | Payne | Oct. 18, 1938 |
| 2,134,110 | Eckman | Oct. 25, 1938 |
| 2,148,834 | Payne | Feb. 28, 1939 |
| 2,249,776 | Moore | July 22, 1941 |
| 2,303,892 | Moore | Dec. 1, 1942 |
| 2,349,510 | Mathews et al. | May 23, 1944 |

FOREIGN PATENTS

| Number | Country | Date |
| --- | --- | --- |
| 4,723 of 1913 | Great Britain | Feb. 19, 1914 |